R. A. FULLWOOD.
WINDMILL.
APPLICATION FILED JAN. 6, 1919.

1,420,652.

Patented June 27, 1922.

Witness
R. A. Thomas

Inventor
R. A. Fullwood
By Victor J. Evans
Attorney

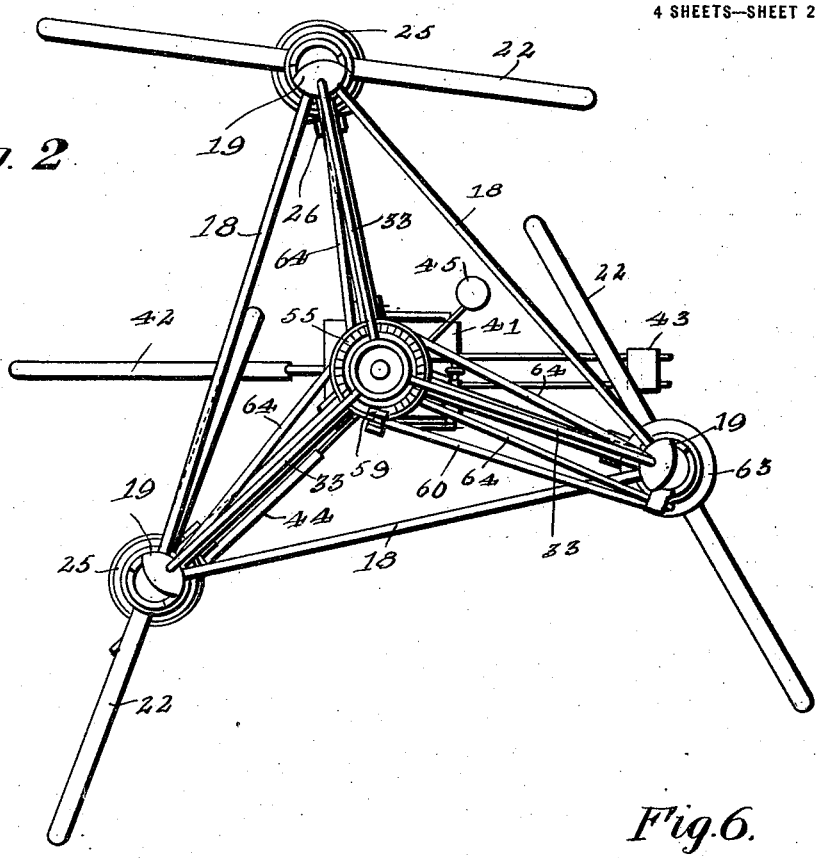
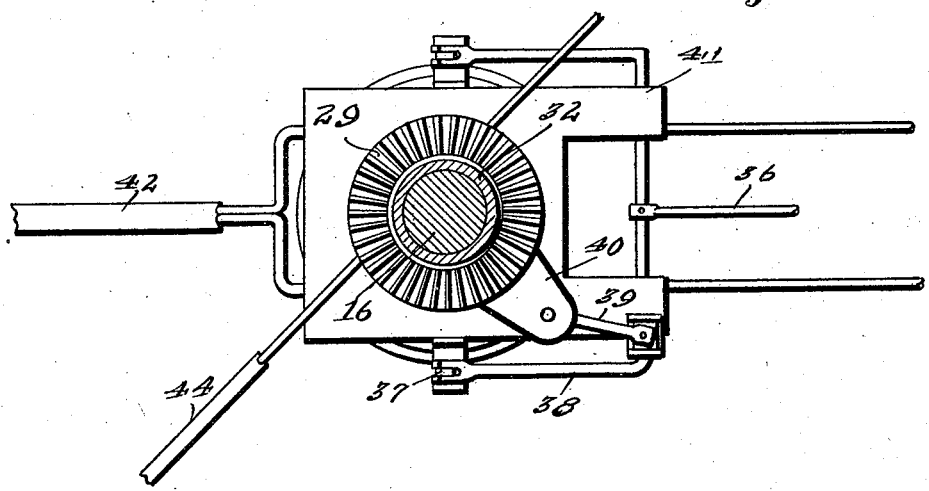

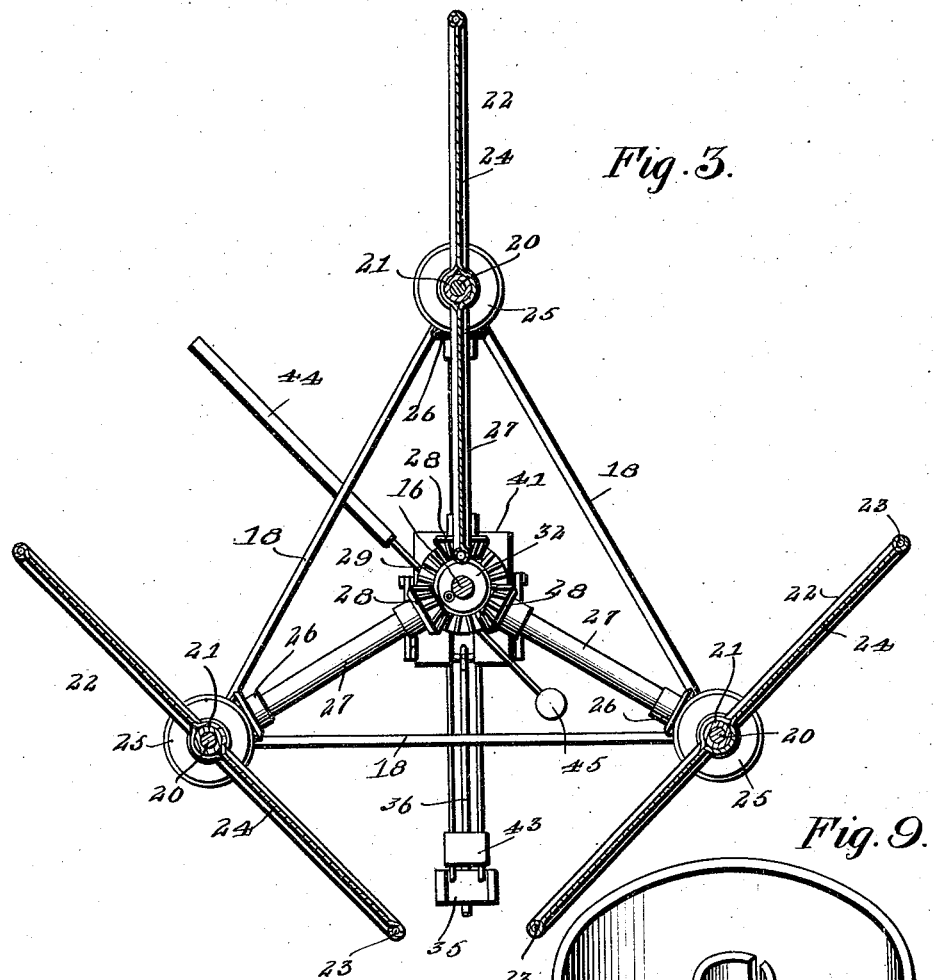

R. A. FULLWOOD.
WINDMILL.
APPLICATION FILED JAN. 6, 1919.
1,420,652.
Patented June 27, 1922.
4 SHEETS—SHEET 4.
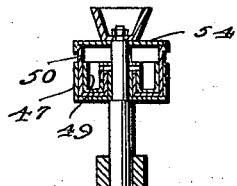
Fig. 4.
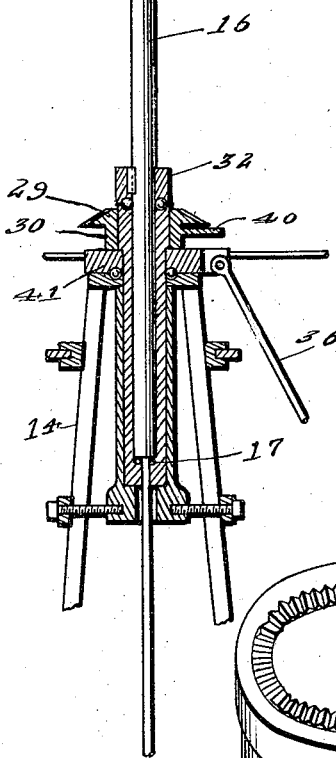
Fig. 7.
Fig. 10.
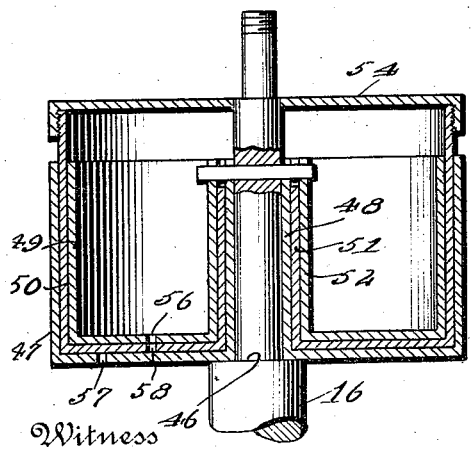
Inventor
R. A. Fullwood.
By Victor J. Evans
Attorney
Witness
R. A. Thomas

UNITED STATES PATENT OFFICE.

ROBERT A. FULLWOOD, OF TUCUMCARI, NEW MEXICO.

WINDMILL.

1,420,652.   Specification of Letters Patent.   Patented June 27, 1922.

Application filed January 6, 1919. Serial No. 269,946.

*To all whom it may concern:*

Be it known that I, ROBERT A. FULLWOOD, a citizen of the United States, residing at Tucumcari, in the county of Quay and State of New Mexico, have invented new and useful Improvements in Windmills, of which the following is a specification.

This invention relates to improvements in wind mills, the object being to provide a mill constructed so as to present the greatest area of the fans or blades to the action of the wind.

Another object is to provide a windmill of simple and cheap construction, which is automatic in operation, so that the power furnished will be of an even and steady character, especially adapting the mill for use in the generation of electricity and for other purposes.

Another object is to provide a novel form of governor regulating means, so as to provide for automatically controlling the speed of the mill and for setting the governor in a manner to regulate such automatic control.

A further object is the provision of novel means for automatically lubricating the various working parts of the mill, so that traction and wear may be reduced to a minimum.

Still other objects and advantages of the invention will appear as the following description is read in connection with the accompanying drawings.

In the drawings:—

Figure 2 is a plan view of the same;

Figure 3 is a horizontal sectional view through the fans looking downward, the fans being shown in the position when the mill is at rest;

Figure 4 is a vertical sectional view on a line with the main shaft;

Figure 6 is a sectional view taken transversely of the main shaft above the center gear looking downward;

Figure 7 is an enlarged sectional view through the lubricating cup;

Figure 9 is a similar view of the outer member;

Figure 10 is a like view of the intermediate member; and

Figure 11 is a detail view illustrating the cam governor for the rotation of the intermediate member of the lubricating cup.

Figure 1:
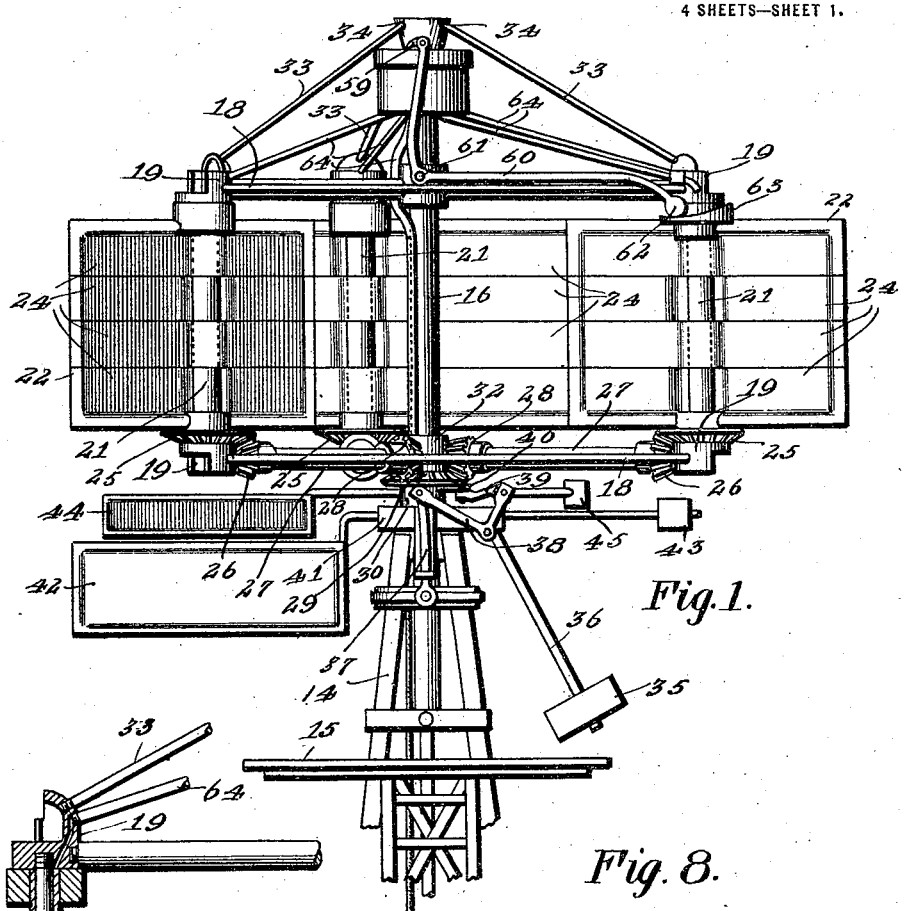
Figure 1 is a side elevation of a windmill embodying the present invention.
Figure 5:
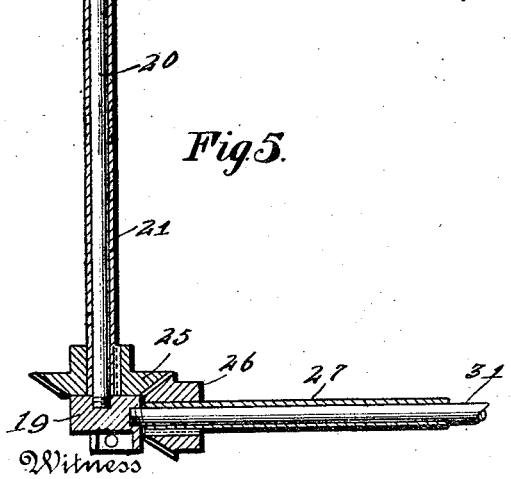
Figure 5 is a similar view through one of the fan shafts.
Figure 8:
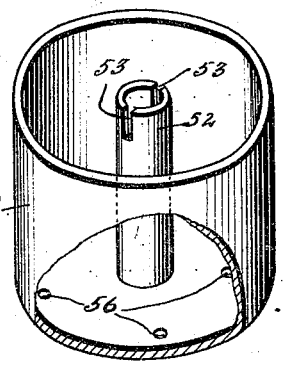
Figure 8 is a detail perspective view of the inner member of the lubricating cup.

Referring to the drawings in detail, wherein like characters of reference denote corresponding parts, the tower of the mill is indicated at 14 and is provided with the usual platform 15 above which the operating members of the mill are positioned. These operating members include the main shaft 16, which is mounted at its lower end in suitable ball bearings as indicated at 17 to aid in overcoming friction. The shaft 16 is adapted to revolve within its bearing and to support a frame, the latter consisting of upper and lower members, each of which comprise triangularly arranged rods 18 having their ends connected by blocks 19. The upper and lower members of this medium are connected by vertically disposed rods 20.

Mounted for rotation upon each of the rods 20, which are preferably three in number is a hollow fan shaft 21, which supports a suitable fan or blade 22, which is composed of a mill frame 23 upon which is secured sheet metal strips 24. Secured to the lower edge of the fan is a bevelled gear 25, which is adapted to engage with a bevelled gear 26, mounted upon one end of a hollow shaft 27. The opposite end of the shaft 27 carries a bevelled gear 28, which is engaged with and driven by a bevelled gear 29 secured to a sleeve 30 upon the shaft 16. The hollow shaft 27 is mounted to revolve upon the shaft or rod 31 having one end secured in one of the blocks 19 and its opposite end in a suitable bearing 32 carried by the shaft 16. Stay rods 33 have one of their ends connected to each of the blocks 19 of the upper member of the frame and their opposite ends suitably connected as shown at 34 to the top of the shaft 16, to further support the frame upon the said shaft. By this construction it will be seen that the fans or blades 24 are capable of revolving with and around the shaft 16 and upon the shafts 21 which pass through the said blades.

One of the novel features of the invention resides in controlling the speed of rotation of the blades or fans 24 and of arranging said blades or fans in a manner to withstand the action of the wind so as to start or stop the operation of the mill. For this purpose the sleeve 30 which carries the gear 29 is mounted for rotary movement upon the shaft 16. By turning the sleeve and with it the gear 29 the fans may be turned either into or out of the wind, the degree of rotation of the sleeve will govern the action of the wind upon the fans and consequently regulate the speed of the mill. When turned into the wind, the momentum of the fan gears bearing upon the sleeve gear will have a tendency to turn said sleeve gear, so as to reduce the speed of the mill when the latter exceeds a predetermined speed. The fans are held in position to receive the full force of the wind by a weight 35, which is mounted upon one end of a rod 36, the other end of which is connected to the sleeve 30 in a manner to normally rotate the said sleeve to a position to present the fans for the full force of the wind. The speed at which the gear 29 will be rotated to reduce the speed of the mill is determined by the position of the weight 35 upon the rod 36, the said weight being adjustable upon the said rod for this purpose.

The gear 29 may be manually positioned through the medium of a rod 37 which is pivotally connected to one arm of a bell crank 38, the latter being in turn connected to an arm 39 pivoted to an extension 40 carried by the sleeve 30, so that a movement of the rod 39 will partially rotate the gear. The rod 36 is also connected to the extension 40.

Extending radially through a frame 41 mounted to rotate with the frame 15, is a vane 42 and extending diametrically upon the opposite side of the shaft is an adjustable weight 43 which acts as a counterbalance for the frame whose function is to hold the fans in position for action by the wind when the mill is in operation. In order to more effectually accomplish this, there is provided an auxiliary vane 44 which is connected to the sleeve 30 and also carries a counter balance weight 45.

Mounted upon the upper end of the shaft 16 and resting upon a shoulder 46 formed upon this shaft, is a lubricating cup. This cup includes an outer member 47, which is cylindrical in form and provided with an open top within which projects a centrally disposed sleeve 48. The sleeve is secured upon the reduced portion of the shaft 16 in a manner to cause the member 47 to revolve with the shaft. Mounted within the member 47 is a similarly shaped inner member 49 and between this member and the member 47 is a like member 50, the central sleeve 51 of which terminates short of the height of the sleeve 48 and 52 of the members 47 and 49 respectively. The member 50 is capable of movement between the members 47 and 49, the latter being held against movement by providing slots 53 in these members for engagement with a pin extending through the shaft. The cover 54 is provided for the member 50 and this cover has located upon its upper surface ratchet teeth 55. The member 49 is adapted to contain the lubricating medium and is provided in its bottom with radially arranged openings 56, which are positioned over and register with openings 57 formed in the bottom of the member 47. The member 50 is provided with a single opening 58, so that during its rotation this opening will consecutively register with each of the openings in the other two members to permit of the passage of the lubricant.

The member 50 is rotated through the medium of a dog 59 positioned upon one end of a bell crank lever 60. The lever 60 is pivotally mounted as shown at 61 and its other arm is provided with a roller 62, which is adapted to travel over a cam 63 rotated with and supported upon one of the shafts 21 of a fan or blade. This mechanism will intermittently rotate the member 50 for the purpose specified, the gearing being such that the same member will make one complete revolution to every 196 revolutions of the mill.

Secured around the openings 57 in the member 47 are pipes 64, three of which conduct lubricant to the upper end of each of the shafts 21, the fourth and fifth serving to lubricate respectively the end 63 and the bearing for the shaft 16. It is preferred that the gears 28 and 29 be of a two to one ratio, so that the fans will revolve upon their own shafts only once to every revolution around the main shaft.

In the operation of the mill, the fans 24 will revolve with and around the shaft 16 and upon the shafts 21, their operation upon the last mentioned shafts being effected through the gears 29, 28, 25 and 26, the first mentioned gear being normally stationary and capable of adjustment in the manner previously set forth for the purpose of regulating or controlling the speed of rotation of the fans and to dispose the fans in a manner to withstand the action of the wind to stop the operation of the mill or to bring the fans into the wind to start operation. Due to the ratio of gearing, the fans revolve upon the shafts 21 once to every two revolutions about the shaft 16. This movement brings the fans into and out of the wind so that they will operate like the sails of a ship sailing on the wind. The momentum of the fans bearing upon the sleeve gear will have a tendency to turn the latter when the mills begins to run fast and thus reduce the speed.

It is believed that when the foregoing description is read in connection with the accompanying drawings, the construction, operation and advantages of the invention will be apparent. The right is reserved to make such changes in the form and proportions thereof as will properly fall within the scope of the appended claims.

Having described the invention, what is claimed is:—

1. A windmill comprising a support, a vertically disposed sleeve mounted for rotation thereon, a main shaft mounted for rotation within and supported by the sleeve, a fan frame carried by the main shaft, vertically disposed fan blades mounted for horizontal pivotal movement within the frame, an arm extending radially from the sleeve, a counterbalance vane, means connecting the vane and the radially extending arm, whereby movement will be imparted to the latter by the pivotal movement of the vane and means connecting the sleeve and fan blades, whereby the position of the blades may be controlled, to control the speed of the mill.

2. A windmill comprising a support, a vertically disposed sleeve mounted for rotation thereon, a main shaft mounted for rotation within and supported by the sleeve, a fan frame carried by the main shaft, vertically disposed shafts included in said frame, sleeves rotatable upon the shafts, fan blades carried by the sleeve, gearing including a center gear secured to the sleeve of the main shaft and connecting said sleeve and the sleeves of the fan blades for controlling the position of the latter and wind controlled means for actuating the center gear.

3. A windmill comprising a support, a vertically disposed sleeve mounted for rotation thereon, a main shaft mounted for rotation within and supported by the sleeve, a fan frame carried by the main shaft, vertically disposed shafts included in said frame, sleeves rotatably mounted upon the shafts, fan blades carried by the sleeves, gearing including a center gear secured to the sleeve of the main shaft and connecting the latter and the sleeves of the fan blades for controlling the position of the latter and weight balanced wind controlled means for operating the center gear.

4. A windmill comprising a support, a vertically disposed sleeve mounted for rotation thereon, a main shaft mounted for rotation within and supported by the sleeve, a fan frame carried by the main shaft, vertically disposed shafts included in said frame, sleeves rotatably mounted upon the shafts, fan blades carried by the sleeves, gearing including a center gear secured to the sleeve of the main shaft and connecting the latter and the sleeves of the fan blades for controlling the position of the latter, a second frame mounted for rotation beneath the fan frame, a vane carried by said second frame and extending radially with respect to the main shaft, an arm also carried by the second frame and disposed in alignment with the vane, a weight adjustable upon the frame and means connecting the frame and center gear, whereby the latter may be rotated by the wind to position the fan blades.

In testimony whereof I affix my signature.

ROBERT A. FULLWOOD.